June 18, 1968 R. J. MOORE 3,388,730
METHOD OF FORMING LAMINATED HOLLOW ARTICLES
Filed May 11, 1966
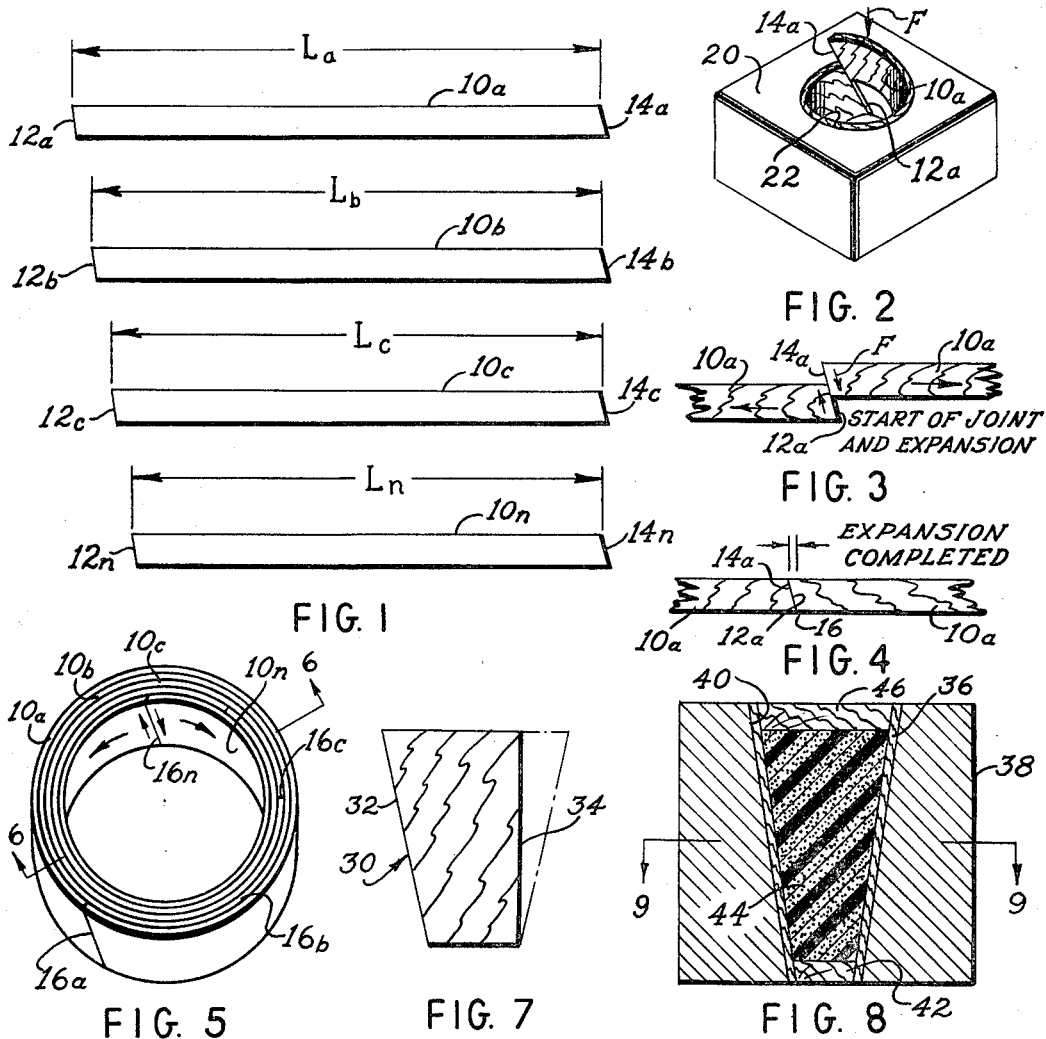
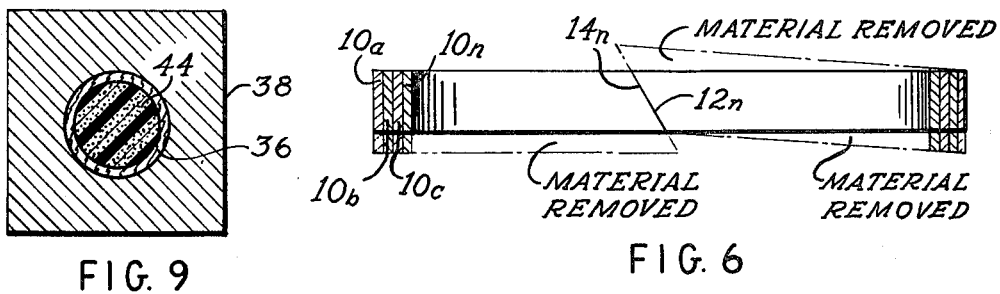
INVENTOR.
ROLAND J. MOORE
BY
Leonard H. King
ATTORNEY United States Patent Office 3,388,730
Patented June 18, 1968

3,388,730
METHOD OF FORMING LAMINATED
HOLLOW ARTICLES
Roland J. Moore, 104—23 113th St.,
Richmond Hill, N.Y. 11418
Filed May 11, 1966, Ser. No. 549,277
8 Claims. (Cl. 144—317)

ABSTRACT OF THE DISCLOSURE

A method is provided for forming laminated plywood into cylinders using a simple forming die.

---

This invention relates generally to plywood forms as well as a novel method for economically forming same.

To the best of my knowledge, the only apparatus presently available for making plywood hoops is extremely complex and, in many cases, of antiquated design. While the art itself is quite old, there has been no substantial change for quite some time in the machines for forming hoops. Much of the prior art required complex camming mechanisms of various configurations or biasing means to maintain radially outward or inward pressure on the segments of the hoop. Generally, there was an expanding die of some sort used. Moreover, all of the prior art devices known at this time require an overlap at the ends of the laminations being formed.

The present invention obviates the need for any of the complex structures referred to above. Unskilled personnel may easily perform the steps required to produce a hoop. There is no heat required, nor is there any need for an expanding die. The several lengths of wood that form the hoop need not be very accurately cut. This provides an important advantage because plywood varies in its thickness as supplied from the mill. Variations in thickness of the individual strips will result in unpredictable circumferential dimensions of successive layers. The method of this invention automatically compensates for these inevitable variations.

The present invention requires a sufficient number of lengths of wood bonded together to build up the wall to the desired thickness. Each strip of wood is a slightly different length, the longest length being the outside ply, the smallest length being the inside ply. In addition, the ends of each strip are cut at an angle, the function of which will be described hereinafter.

A simple forming member having a recess of the desired outside dimension of the end product is used in the preparation of the hoop. The first strip of wood is deformed into the approximate shape of the end product and is placed in the recess in the forming member. The ends of the strip are in abutting relationship. Because of the angularity of the opposed end faces, a downward force on the edge of the strip will cause the ends of the strip to slide against each other and radially expand the strip in a uniform manner. The strip may be forced into place by hammering or applying mechanical force on the edge thereof with a resilient mallet until the top edge is flush with the top of the forming member. Should the strip have a length too great to be accommodated in the recess, the excess edge of the strip may be removed after it has been forced as far as it will go into the recess.

The second strip is placed into the forming member on the inside of the first strip with the angular end faces abutting. The strip is again forced down, causing it to expand radially. It should be noted that it is preferable for the abutment of the end faces of the second strip to be angularly displaced from the similar joint in the first strip. The joint of all subsequent strips, however many are needed, should similarly be displaced from the immediately preceding joint.

It will be apparent that the method of this invention does not require highly skilled labor. Similarly, complex forming apparatus is not required. The plywood product resulting from this invention is extremely rigid because the inclined plane effect is utilized in assembly. The edges of the assembled strip may be finished and made parallel to each other by router-sawing or sanding, so that very accurate widths need not be cut.

The present invention has utility in the fabrication of chairs, for example. The rim of the chair seat could be made of a plywood hoop in the manner described above. The chair seat, of course, is not limited to a circular shape. The forming member into which the wood strips are inserted determines the geometric shape of the finished product. Where circular forms are required, such as in snare drums, banjoes, etc., the method of the present invention provides low cost means for forming same.

The method of this invention is also applicable to the manufacture of tubular products. For example, tapered plywood legs may be produced for furniture. As in the previous embodiment, lengths of wood having angular ends are placed in a forming member. In this case the individual elements are in sheet form and a plastic core is provided. End plugs may also be utilized to facilitate the attachment of hardware.

Accordingly, it is an object of this invention to provide an improved method for forming annular wooden structures.

It is a particular object to provide an improved method for forming multilayer annular wooden structures.

It is a particular object of this invention to provide a method, as mentioned above, where neither an internal expanding die nor external die is required.

Still another object of this invention is to provide a method for forming hoops that does not require the application of heat.

A further object of this invention is to provide a method of laminating wood into hoop form wherein the ends of the lamination do not overlap.

A particular object of this invention is to provide a method for forming plywood hoops and other unitized shapes.

Yet another object is to provide a method for forming hollow plywood articles that do not have the structural weaknesses inherent in the prior art devices wherein two halves of the article are joined together.

Another specific object of this invention is to provide a method for forming plywood legs for furniture or the like.

These and other features, objects and advantages of the invention will, in part, be pointed out with particularity and will, in part, become obvious from the following more detailed description of the invention, taken in conjunction with the accompanying drawing which forms an integral part thereof.

In the various figures of the drawing like reference characters designate like parts.

In the drawing:

FIG. 1 is a developed plan view of the strips used in making a plywood hoop;

FIG. 2 is a perspective view of a forming member used to assembled the strips shown in FIG. 1;

FIG. 3 is a fragmentary elevational view illustrating a typical joint at the start of assembly;

FIG. 4 is a fragmentary elevational view illustrating the FIG. 4 joint fully assembled;

FIG. 5 is a perspective view of a finished hoop;

FIG. 6 is a sectional view taken along line 6—6 of FIG. 5 schematically showing material that may be removed by a finishing step.

FIG. 7 is a developed plan view of a material blank used in the manufacture of a tapered plywood furniture leg;

FIG. 8 is a longitudinal sectional elevational view of a tapered plywood leg using the blank of FIG. 7; and FIG. 9 is a transverse sectional elevational view taken along line 9—9 of FIG. 8.

Referring now to FIG. 1, the elements of a four-layer plywood hoop are shown in developed form. Strips 10a, 10b, 10c and 10n are each cut to a different length $L_a$, $L_b$, $L_c$, and $L_n$, respectively. The length indicated represents the circumferential dimension of each layer. It is apparent that the inner layers must be shorter than the outer layers. Of particular importance is the end configuration of each strip. Ends 12a to 12n and 14a to 14n, respectively, are each cut at an angle to the length of the strip. In the assembled condition (FIG. 5), the abutting end faces of each strip define joints 16a, 16b, 16c and 16n. It has been found that the maximum practical angle for the strip ends is between 30° and 40°.

Forming member 20 is provided with a recess 22 therein having a shape conforming to that of the finished product. The first strip 10a is placed in the recess such that it hugs the surface thereof. FIG. 3 illustrates the initiation of the joint defined by the ends 12a and 14a of the first strip 10a. It will be seen that end 12a is fully seated and end 14a is arranged to slide thereon. A downward force, as indicated by arrow F, will tend to urge the ends of the strip away from each other because of the inclined plane effect resulting from the interaction of end faces 12a and 14a. The strip will therefore expand radially until it fully occupies the entire surface of the recess 22.

In FIG. 4, the strip is shown completely expanded. If for any reason the length of the strip is oversized and end 14a cannot be fully seated, it is a simple matter to remove the excess. This step is schematically shown in FIG. 6 wherein the material removed is illustrated in dotted outline. The subsequent strips 10b, 10c and 10n are assembled in a similar manner to form the product shown in FIG. 5. It will be seen that the two opposed edges defined by the length dimensions are substantially parallel to each other.

It has been found desirable to angularly stagger the joints 16a–16n of successive layers, as shown in FIG. 5. This type of construction tends to equalize the radial and circumferential forces acting on each strip. Although not specifically spelled out, it is understood that suitable adhesives are applied between successive layers of the hoop.

While a circular product has been shown, it should be clearly understood that the present invention is not limited thereto. Conceivably, an elliptical shape could be formed by the same method as well as a rectangular or square outline having generously rounded corners. In the last mentioned embodiment, the sides of the square or rectangle need not necessarily be straight. The shape of the end product is determined by the recess in the forming member.

As mentioned earlier, the present invention may be used to make tubular plywood products, for example, a tapered furniture leg. A blank of material 30 for such a product is shown in FIG. 7. Elongated edges 32 and 34 function as described in connection with the previous embodiment with regard to the inclined plane effect. However, for reasons of economy, one of the two edges may be perpendicular to the end planes while the opposite edge is at an angle to the end planes. While this construction will provide a leg having a skewed seam, it is not necessarily undesirable since a covering could be applied to conceal the seam. Alternatively, although at the expense of wasting some additional material, both side edges could be blanked at an angle to the end planes. The seam would then be parallel to the longitudinal axis of the leg.

FIG. 8 and FIG. 9 illustrate a tapered leg 36 made from the blank of FIG. 7. One or more blanks 30 are placed in a forming member 38 having a suitably tapered recess 40. A bottom plug 42 is positioned at the lower end of the recess and a core 44 of rigid polyurethane say, in the range of 10 lbs.–20 lbs. per cu. ft. is used to fill almost all of the remaining cavity. Finally, a top plug 46 is driven into place. The top and bottom plugs are convenient for the attachment of appropriate hardware while the core provides a lightweight rigid reinforcement. The top and bottom ends may be squared off as required. While polyurethane is currently preferred, other suitable fillers may be employed.

Both the products as well as the method for forming same represent a substantial improvement over the currently available prior art. The products are rugged in construction and accurate in dimension. The wall of the tubular or annular member may be as thick as is required by the particular application. The method employed to fabricate the articles requires neither heat nor an expanding or compression mandrel. Highly skilled and costly labor is not needed to practice the invention.

Having thus disclosed the best embodiment of the invention presently contemplated, it is to be understood that various changes and modifications may be made by those skilled in the art without departing from the spirit of the invention.

What is claimed is:

1. The method of forming a hollow article comprising the steps of:
    (a) cutting a sheet of wood to a length equivalent to the circumference of the article to be formed;
    (b) forming at least one of two opposed ends of the sheet at an angle to the longitudinal axis of the article to be formed;
    (c) inserting the sheet into the recess of a forming member whereby the angularly disposed ends of the sheet are in sliding abutment with each other;
    (d) applying a force to the edge of the sheet whereby the angular ends thereof slide relatively to each other and the sheet expands radially;
    (e) securing the abuttingly opposed ends of the sheets to each other to define an assembly; and
    (f) removing the formed sheet from the forming member.

2. The method in accordance with claim 1 including the steps of cutting additional sheets to different lengths and inserting the sheets into the forming member in sequence starting with the longest element.

3. The method in accordance with claim 1 including the step of forming two opposed ends of the sheet at an angle to the longitudinal axis of the article to be formed.

4. The method in accordance with claim 1 including the step of removing material from the laminated assembly whereby the two opposed edges of the sheet perpendicular to the longitudinal axis of the article are substantially parallel to each other.

5. The method in accordance with claim 1 including the step of placing a core within the laminated assembly.

6. The method in accordance with claim 1 including the step of securing a plug member in at least one end of the laminated assembly.

7. The method in accordance with claim 1 including the step of securing a plug member in both ends of the laminated assembly.

8. The method in accordance with claim 1 wherein said step of laminating the sheets comprises the step of applying adhesive to the opposed faces of adjacent sheets.

References Cited

UNITED STATES PATENTS

| | | | |
|---|---|---|---|
| 251,259 | 12/1881 | Lockwood | 156—217 |
| 792,005 | 6/1905 | Coburn | 156—218 |
| 1,576,024 | 3/1926 | Barrantes | 156—217 |
| 2,647,556 | 8/1953 | Courtney | 156—294 |
| 640,524 | 1/1900 | Bartels | 144—258 |
| 529,112 | 11/1894 | Elliott | 144—316 |
| 668,399 | 2/1901 | Annett | 144—269 |
| 93,870 | 8/1869 | Franenberger. | |
| 958,390 | 5/1910 | Gibbs | 144—258 |

FOREIGN PATENTS 125,553  6/1904  Great Britain.

WILLIAM W. DYER, Jr., *Primary Examiner.*

R. J. ZLOTNIK, *Assistant Examiner.*